US012712280B2

(12) United States Patent
Lin et al.

(10) Patent No.: US 12,712,280 B2
(45) Date of Patent: Aug. 18, 2026

(54) PLANAR ANTENNA

(71) Applicant: ALPHA NETWORKS INC., Hsinchu (TW)

(72) Inventors: Chih-Yen Lin, Hsinchu (TW); Jia-Yan Lin, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 39 days.

(21) Appl. No.: 18/928,914

(22) Filed: Oct. 28, 2024

(65) Prior Publication Data

US 2025/0385435 A1 Dec. 18, 2025

(30) Foreign Application Priority Data

Jun. 17, 2024 (TW) ................................ 113122332

(51) Int. Cl.

*H01Q 13/10* (2006.01)
*H01Q 1/48* (2006.01)
*H01Q 5/30* (2015.01)
*H01Q 9/04* (2006.01)

(52) U.S. Cl.

CPC ............. *H01Q 13/106* (2013.01); *H01Q 1/48* (2013.01); *H01Q 5/30* (2015.01); *H01Q 9/0407* (2013.01)

(58) Field of Classification Search

CPC .......... H01Q 13/106; H01Q 1/48; H01Q 5/30; H01Q 9/0407

See application file for complete search history.

(56) References Cited

U.S. PATENT DOCUMENTS

2014/0132469 A1* 5/2014 Wang .................. H01Q 1/2266 343/821
2015/0109167 A1* 4/2015 Yarga .................... H01Q 5/371 343/700 MS
2022/0255226 A1 8/2022 Wang et al.

OTHER PUBLICATIONS

European Search Report for European Application No. 24209920.8, dated Mar. 27, 2025.

* cited by examiner

*Primary Examiner* — Dieu Hien T Duong
(74) *Attorney, Agent, or Firm* — Birch, Stewart, Kolasch & Birch, LLP

(57) ABSTRACT

A planar antenna is defined with a first axis having a first direction and a second direction opposite to the first direction and a second axis having a third direction and a fourth direction opposite to the third direction and includes a substrate having a surface on which a first radiation element, a first ground element, a second radiation element, and a second ground element are disposed. An end of a first main section of the first radiation element is for being fed with a signal. The first ground element is on a side of the first radiation element in the second direction. The second radiation element is on a side of the first main section in the third direction. The second ground element is on a side of a second main section of the first ground element in the third direction.

9 Claims, 19 Drawing Sheets

PLANAR ANTENNA

BACKGROUND OF THE INVENTION

Technical Field

The present invention relates generally to an antenna, and more particularly to a planar antenna, which is applied to a wireless network.

Description of Related Art

It's known that the internet has been an indispensable part of our life with the progress of technologies. Connections among electronic devices are classified into a wired network and a wireless network. Due to a diversity and a popularization of the electronic devices with a function of network connection (e.g., cell phone, notebook, smart appliance, automobile), the demand of the network connection of the electronic devices gradually increases and the amount of information transmitted by the electronic devices rapidly increases, thereby driving a rapid development of wireless fidelity (Wi-Fi). A generation of Wi-Fi develops from the early Wi-Fi 1 to the latest Wi-Fi 7. Each new generation of Wi-Fi is provided with a faster transmission rate and a greater bandwidth than the previous generation of Wi-Fi through different operating frequency bands.

A planar antenna is one of the important components for using Wi-Fi. By converting an electrical signal into an electromagnetic wave signal, the planar antenna transmits and correspondingly receives the electromagnetic wave signal, thereby achieving a purpose of the wireless communication. Therefore, to satisfy the demand of the frequency bands of Wi-Fi and fit a reduced size of the electronic devices, how to provide a planar antenna with a raised number of operating frequency bands and a reduced size is a problem needed to be solved.

BRIEF SUMMARY OF THE INVENTION

In view of the above, the primary objective of the present invention is to provide a planar antenna with a raised number of operating frequency bands and a reduced size.

The present invention provides a planar antenna defined with a first axis and a second axis, wherein the second axis is perpendicular to the first axis. The first axis is defined with a first direction and a second direction opposite to the first direction. The second axis is defined with a third direction and a fourth direction opposite to the third direction. The planar antenna includes a substrate, a first radiation element, a first ground element, a second radiation element, and a second ground element, wherein the substrate has a surface. The first radiation element is disposed on the surface of the substrate and has a first main section and a first radiation section, wherein the first main section has a first end and a second end along the first axis. The first end of the first main section is adapted to be fed with a signal. The first main section extends from the first end of the first main section to the second end of the first main section in the first direction. The first radiation section is connected to the second end of the first main section and is located on a side of the first main section in the third direction. The first ground element is disposed on the surface of the substrate and has a second main section and a first ground section, wherein the second main section has a first end and a second end along the first axis. The second main section extends from the first end of the second main section to the second end of the second main section in the second direction. The first ground section is connected to the second end of the second main section and is located on a side of the second main section in the third direction. The second radiation element is disposed on the surface of the substrate, wherein the second radiation element is located on a side of the first main section in the third direction and located on a side of the first radiation section in the second direction. The second radiation element has a first slot, wherein the first slot extends in the first direction and has a first open end and a first closed end. The second ground is disposed on the surface of the substrate, wherein the second ground element is located on a side of the second main section in the third direction and located on a side of the first ground section in the first direction. The second ground element has a second slot, wherein the second slot extends in the second direction and has a second open end and a second closed end. The second open end corresponds to the first open end. Wherein a separating slot is formed between the second radiation element and the second ground element and extends along the second axis. An end of the separating slot communicates with the first open end and the second open end. Wherein the second radiation element is connected to the first main section of the first radiation element through a first connecting section. The second ground element is connected to the second main section of the first ground element through a second connecting section.

With the aforementioned design, through the first radiation element, the first ground element, the second radiation element, and the second ground element, the planar antenna fulfills an equivalent antenna length by bending, thereby achieving a purpose of reducing the size of the planar antenna. Through the first slot, the second slot, and the separating slot, the planar antenna is provided with an impedance matching of a low frequency and a high frequency to raise the number of the operating frequency bands.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
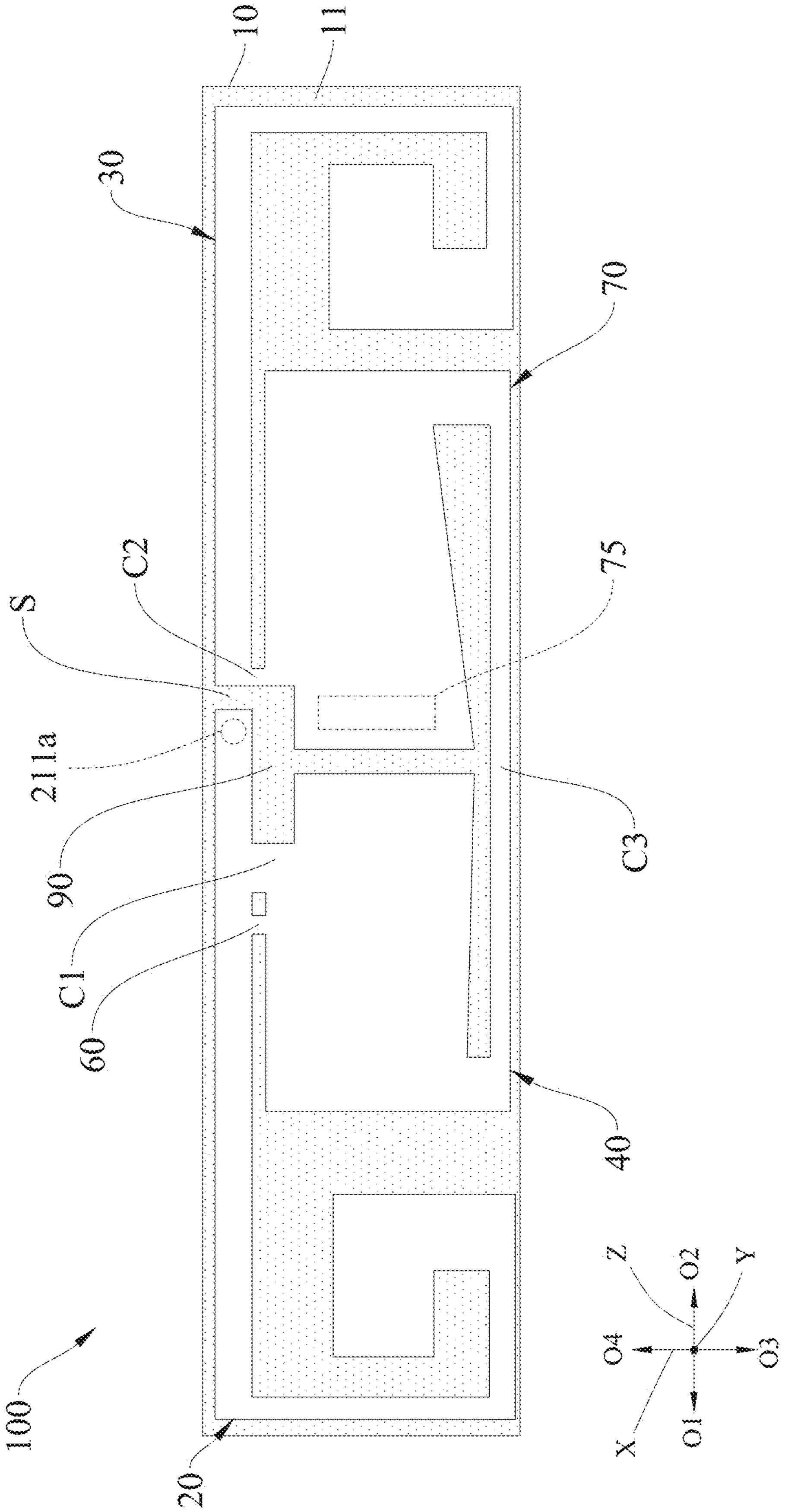
FIG. 1 is a schematic view of the planar antenna according to a first embodiment of the present invention.

A planar antenna 100 according to a first embodiment of the present invention is illustrated in FIG. 1 to FIG. 4 and is applied to a wireless communication device. The planar antenna 100 is defined with a first axis Z, a second axis X, and a third axis Y that are perpendicular to one another. The first axis Z is defined with a first direction O1 and a second direction O2 opposite to the first direction O1. The second axis X is defined with a third direction O3 and a fourth direction O4 opposite to the third direction O3. The planar antenna 100 includes a substrate 10, a first radiation element 20, a first ground element 30, a second radiation element 40, a matching section 60, and a second ground element 70. In the current embodiment, the first radiation element 20, the first ground element 30, the second radiation element 40, the matching section 60, and the second ground element 70 is made of copper foil.

Figure 2:
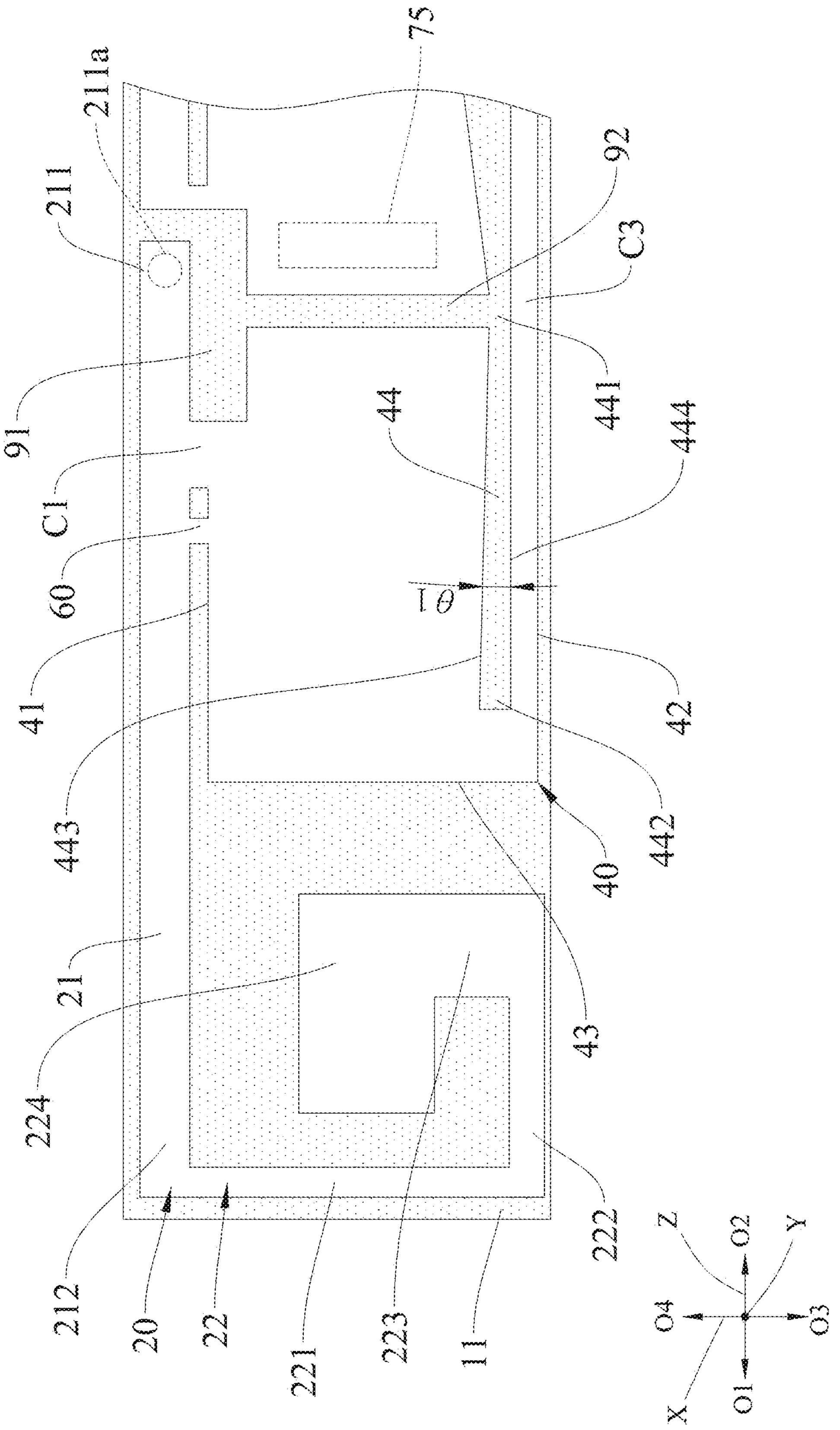
FIG. 2 is a schematic view of a part of the planar antenna according to the first embodiment of the present invention.
Figure 3:
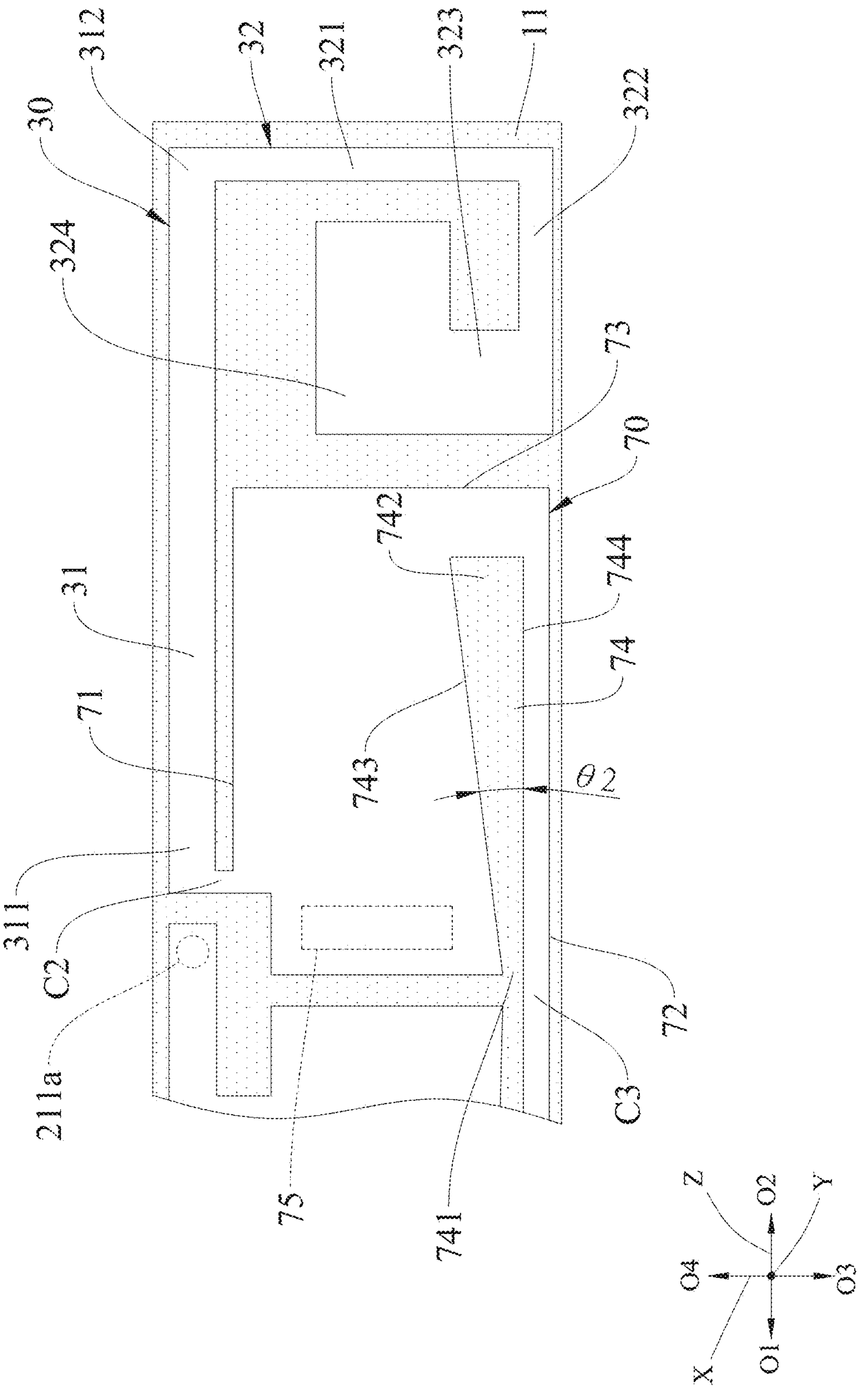
FIG. 3 is a schematic view of another part of the planar antenna according to the first embodiment of the present invention.

Referring to FIG. 1 to FIG. 3, the substrate 10 has a surface 11 along the third axis Y. In the current embodiment, the substrate 10 is made of FR4 (flame retardant 4) and a size of the substrate 10 is 32.5 mm along the first axis Z, is 8 mm along the second axis X, and is 0.4 mm along the third axis Y. The first radiation element 20 is disposed on the surface 11 of the substrate 10 and has a first main section 21 and a first radiation section 22, wherein the first main section 21 has a first end 211 and a second end 212 along the first axis Z. The first end 211 of the first main section 21 has a feeding point 211*a* to be fed with a signal. A transmission line (not shown) is electrically connected to the feeding point 211*a*. An impedance of the transmission line is 50 ohm. In the current embodiment, the transmission line is a coaxial cable; a line diameter of the transmission line is 1.13 mm and a length of the transmission line is 100 mm, but not limited thereto; a centre wire of the transmission line is welded to the feeding point 211*a*. The first main section 21 extends from the first end 211 of the first main section 21 to the second end 212 of the first main section 21 in the first direction O1. The first radiation section 22 is connected to the second end 212 of the first main section 21 and is located on a side of the first main section 21 in the third direction O3. The first radiation section 22 includes a first side section 221, a second side section 222, a third side section 223, and a first extending section 224, wherein the first side section 221 is connected to the second end 212 of the first main section 21 and extends in the third direction O3. The second side section 222 is connected to an end of the first side section 221 and extends in the second direction O2. The third side section 223 is connected to an end of the second side section 222 and extends in the fourth direction O4. The first extending section 224 is connected to an end of the third side section 223 and extends in the first direction O1. In this way, through the first side section 221, the second side section 222, the third side section 223, and the first extending section 224, the planar antenna 100 fulfills an equivalent antenna length by bending and a whole structure of the planar antenna 100 could be more compact, so that the planar antenna 100 could have a reduced size while being operational within a low frequency band (e.g., 2.4 GHz).

The first ground element 30 is disposed on the surface 11 of the substrate 10 and is located on a side of the first radiation element 20 in the second direction O2. The first ground element 30 has a second main section 31 and a first ground section 32, wherein the second main section 31 has a first end 311 and a second end 312 along the first axis Z. A space S is provided between the first end 311 of the second main section 31 and the first end 211 of the first main section 21. The second main section 31 extends from the first end 311 of the second main section 31 to the second end 312 of the second main section 31 in the second direction O2. The first ground section 32 is located on a side of the second main section 31 in the third direction O3. A structure of the first ground section 32 and a structure of the first radiation section 22 are symmetrical along the first axis Z. The first ground section 32 includes a fourth side section 321, a fifth side section 322, a sixth side section 323, and a second extending section 324, wherein the fourth side section 321 is connected to the second end 312 of the second main section 31 and extends in the third direction O3. The fifth side section 322 is connected to an end of the fourth side section 321 and extends in the first direction O1. The sixth side section 323 is connected to an end of the fifth side section 322 and extends in the fourth direction O4. The second extending section 324 is connected to an end of the sixth side section 323 and extends in the second direction O2. In this way, through the fourth side section 321, the fifth side section 322, the sixth side section 323, and the second extending section 324, the planar antenna 100 fulfills the equivalent antenna length by bending to be operational within the low frequency band (e.g., 2.4 GHz) and the size of the planar antenna 100 could be reduced.

The second radiation element 40 is disposed on the surface 11 of the substrate 10 and is located on a side of the first main section 21 in the third direction O3. The second radiation element 40 is located on a side of the first radiation section 22 in the second direction O2, has a first edge 41 and a second edge 42 along the second axis X, and has a third edge 43 adjacent to the first radiation section 22 along the second axis X. The first edge 41 of the second radiation element 40 is located between the first main section 21 of the first radiation element 20 and the second edge 42 and is connected to the first main section 21 of the first radiation element 20 through a first connecting section C1. The second radiation element 40 has a first slot 44, wherein the first slot 44 is located on an inner side of the second edge 42 of the second radiation element 40. The first slot 44 extends in the first direction O1 and has a first open end 441 and a first closed end 442. A width of the first slot 44 gradually increases in the first direction O1, i.e., a width of the first closed end 442 along the second axis X is greater than a width of the first open end 441 along the second axis X. The first slot 44 has a first inclined edge 443 and a first straight edge 444. Along the second axis X, the first inclined edge 443 is located between the first main section 21 of the first radiation element 20 and the first straight edge 444. A first angle O1 is formed between an imaginary extension of the first inclined edge 443 and an imaginary extension of the first straight edge 444 and is between 1° and 3°.

The matching section 60 is disposed on the surface 11 of the substrate 10 and is located on a side of the first connecting section C1 in the first direction O1. The matching section 60 is connected to the first main section 21 of the first radiation element 20 and the first edge 41 of the second radiation element 40 and is used for an impedance matching of a low frequency.

The second ground element 70 is disposed on the surface 11 of the substrate 10 and is located on a side of the second main section 31 in the third direction O3 and on a side of the first ground section 32 in the first direction O1. The second ground element 70 has a first edge 71 and a second edge 72 along the second axis X and has a third edge 73 adjacent to the first ground section 32 along the second axis X. The first edge 71 is located between the second main section 31 of the first ground element 30 and the second edge 72. The first edge 71 of the second ground element 70 is connected to the first end 311 of the second main section 31 through a second connecting section C2. The second ground element 70 has a second slot 74, wherein the second slot 74 is located on an inner side of the second edge 72 of the second ground element 70. The second slot 74 extends in the second direction O2 and has a second open end 741 and a second closed end 742, wherein the second open end 741 communicates with the first open end 441. A width of the second closed end 742 along the second axis X is greater than the width of the first closed end 442 along the second axis X. A width of the second slot 74 gradually increases in the second direction O2, i.e., the width of the second closed end 742 along the second axis X is greater than a width of the second open end 741 along the second axis X. The second slot 74 has a second inclined edge 743 and a second straight edge 744. Along the second axis X, the second inclined edge 743 is located between the second main section 31 and the second straight edge 744. A second angle θ2 is formed between an imaginary extension of the second inclined edge 743 and an imaginary extension of the second straight edge 744 and is between 7° and 9°. The second angle θ2 is greater than the first angle θ1. The first slot 44 and the second slot 74 are used for an impedance matching of a high frequency to form a matching way of balanced-to-unbalanced (Balun), so that the planar antenna 100 does not need to be extra grounded to the wireless communication device.

In the current embodiment, the second ground element 70 is connected to the second radiation element 40 through a third connecting section C3. The third connecting section C3 extends along the first axis Z. A side of the third connecting section C3, the first straight edge 444, and the second straight edge 744 are located in the same extending line. The other side of the third connecting section C3, the second edge 42 of the second radiation element 40, and the second edge 72 of the second ground element 70 are located in the same extending line.

A separating slot 90 is formed between the second radiation element 40 and the second ground element 70 and extends along the second axis X. The separating slot 90 includes a first slot section 91 and a second slot section 92, wherein the first slot section 91 is located between the first connecting section C1 and the second connecting section C2 along the first axis Z and communicates with the space S along the second axis X. The second slot section 92 extends along the second axis X. An end of the second slot section 92 communicates with the first open end 441 and the second open end 741. The other end of the second slot section 92 communicates with the first slot section 91. In this way, through the second slot section 92, the second radiation element 40, and the second ground element 70, a purpose of the impedance matching of the high frequency (e.g., 5 GHz~6 GHz) could be achieved. Additionally, according to a location of the second radiation element 40, a location of the second ground element 70, and a location of the separating slot 90, the second radiation element 40, the second ground element 70, and the separating slot 90 are disposed within an area surrounded by the first radiation element 20 and the first ground element 30, so that the whole structure of the planar antenna 100 is more compact, thereby reducing the size of the planar antenna 100.

In the current embodiment, the second ground element 70 is defined with a ground area 75, wherein the ground area 75 is adjacent to the separating slot 90 and is spaced with the feeding point 211*a* along the second axis X. A mesh layer of the transmission line is welded to the ground area 75.

Figure 4:
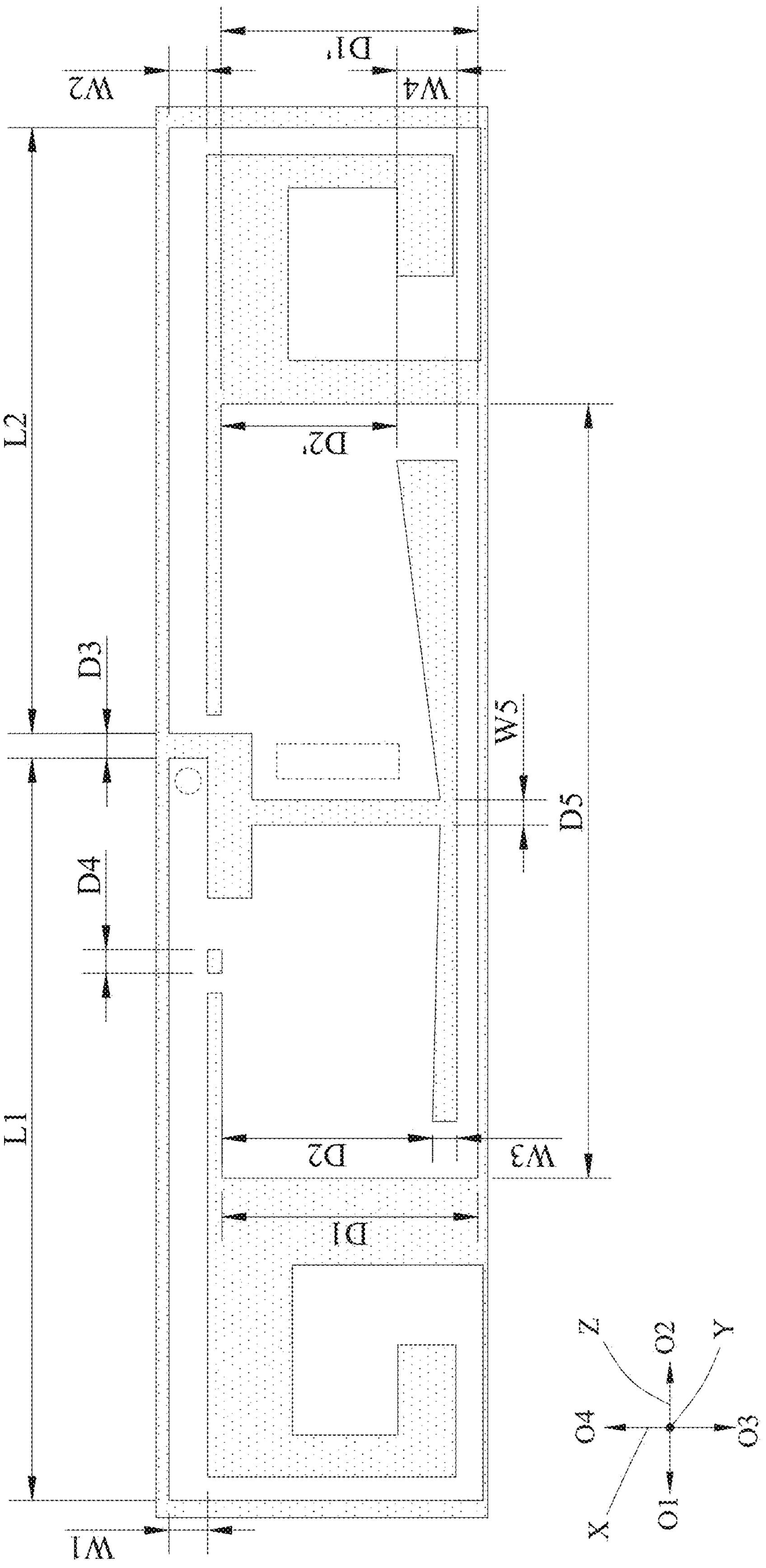
FIG. 4 is a schematic view of the planar antenna according to the first embodiment of the present invention, showing a size of the planar antenna.

Referring to FIG. 4, along the second axis X, a distance between the first edge 41 of the second radiation element 40 and the second edge 42 of the second radiation element 40 is a first distance D1; a minimum distance between the first edge 41 of the second radiation element 40 and the first closed end 442 of the first slot 44 is a second distance D2; the second distance D2 is between 0.7 and 0.9 times the first distance D1. Along the second axis X, a distance between the first edge 71 of the second ground element 70 and the second edge 72 of the second ground element 70 is a first distance D1'; a minimum distance between the first edge 71 and the second closed end 742 of the second slot 74 is a second distance D2'; the second distance D2' is between 0.6 and 0.7 times the first distance D1'. In the current embodiment, a tolerance of the planar antenna 100 is between −0.1 mm and +0.1 mm; both the first distance D1 of the second radiation element 40 and the first distance D1' of the second ground element 70 are 5.9±0.1 mm; the second distance D2 of the second radiation element 40 is 4.88±0.1 mm and is 0.83 times the first distance D1; the second distance D2' of the second ground element 70 is 4.05±0.1 mm and is 0.69 times the first distance D1'. The first main section 21 has a first length L1 of 17.24±0.1 mm along the first axis Z and a first width W1 of 1±0.1 mm along the second axis X. The second main section 31 has a second length L2 of 14.16±0.1 mm along the first axis Z and a second width W2 of 1±0.1 mm along the second axis X. A third length D3 of the space S located between the first main section 21 and the second main section 31 is 0.59±0.1 mm along the first axis Z. The first closed end 442 has a third width W3 of 0.51±0.1 mm along the second axis X. The second closed end 742 has a fourth width W4 of 1.41±0.1 mm along the second axis X. The second slot section 92 of the separating slot 90 has a fifth width W5 of 0.5±0.1 mm along the first axis Z. A fourth distance D4 between the matching section 60 and the first connecting section C1 is 0.51±0.1 mm along the first axis Z. A fifth distance D5 between the third edge 43 of the second radiation element 40 and the third edge 73 of the second ground element 70 is 18.9±0.1 mm along the first axis Z.

Figure 5:
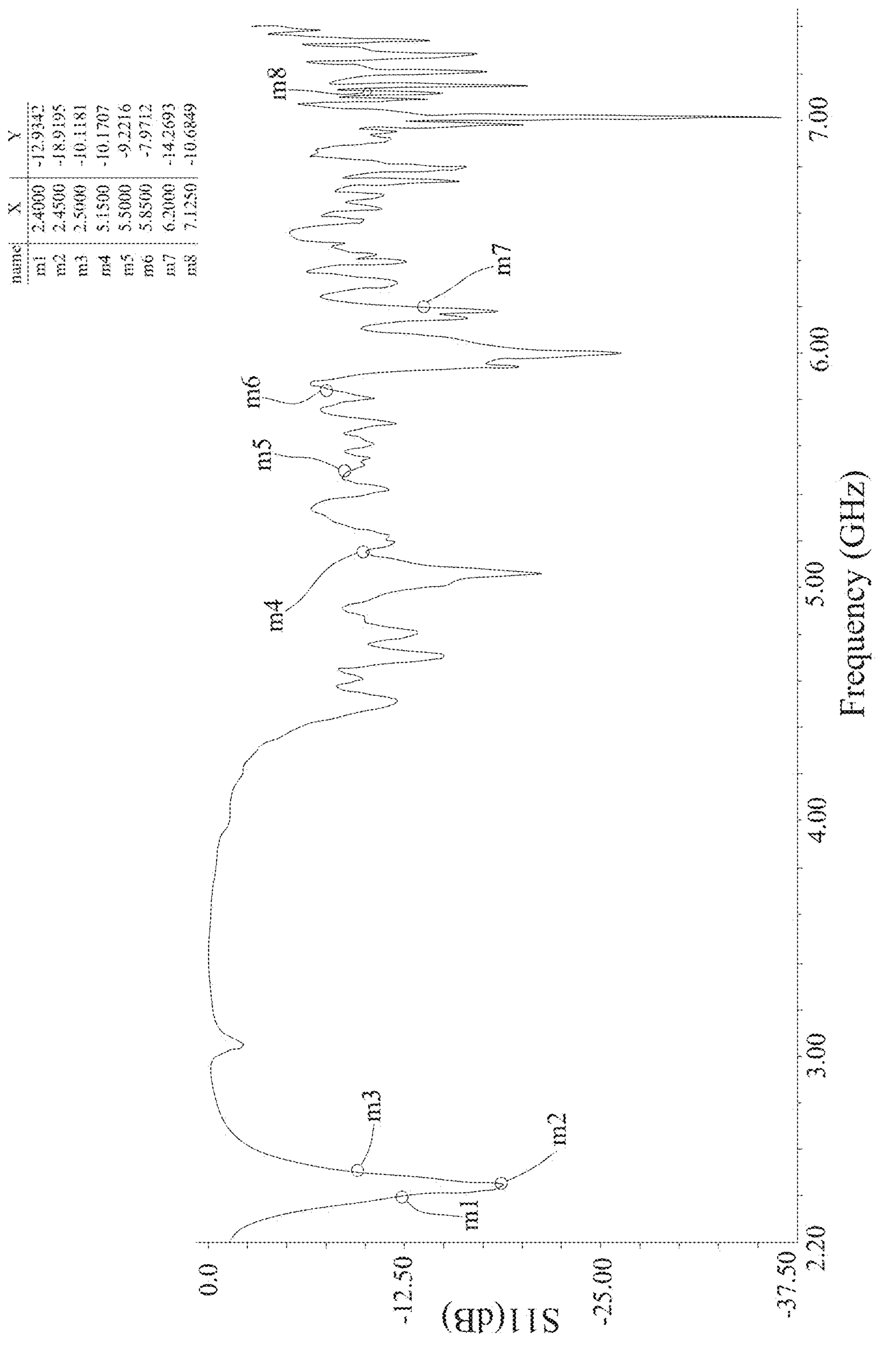
FIG. 5 is a schematic view showing a return loss of the planar antenna operating between 2.2 GHz and 7.4 GHz according to the first embodiment of the present invention.
Figure 6A:
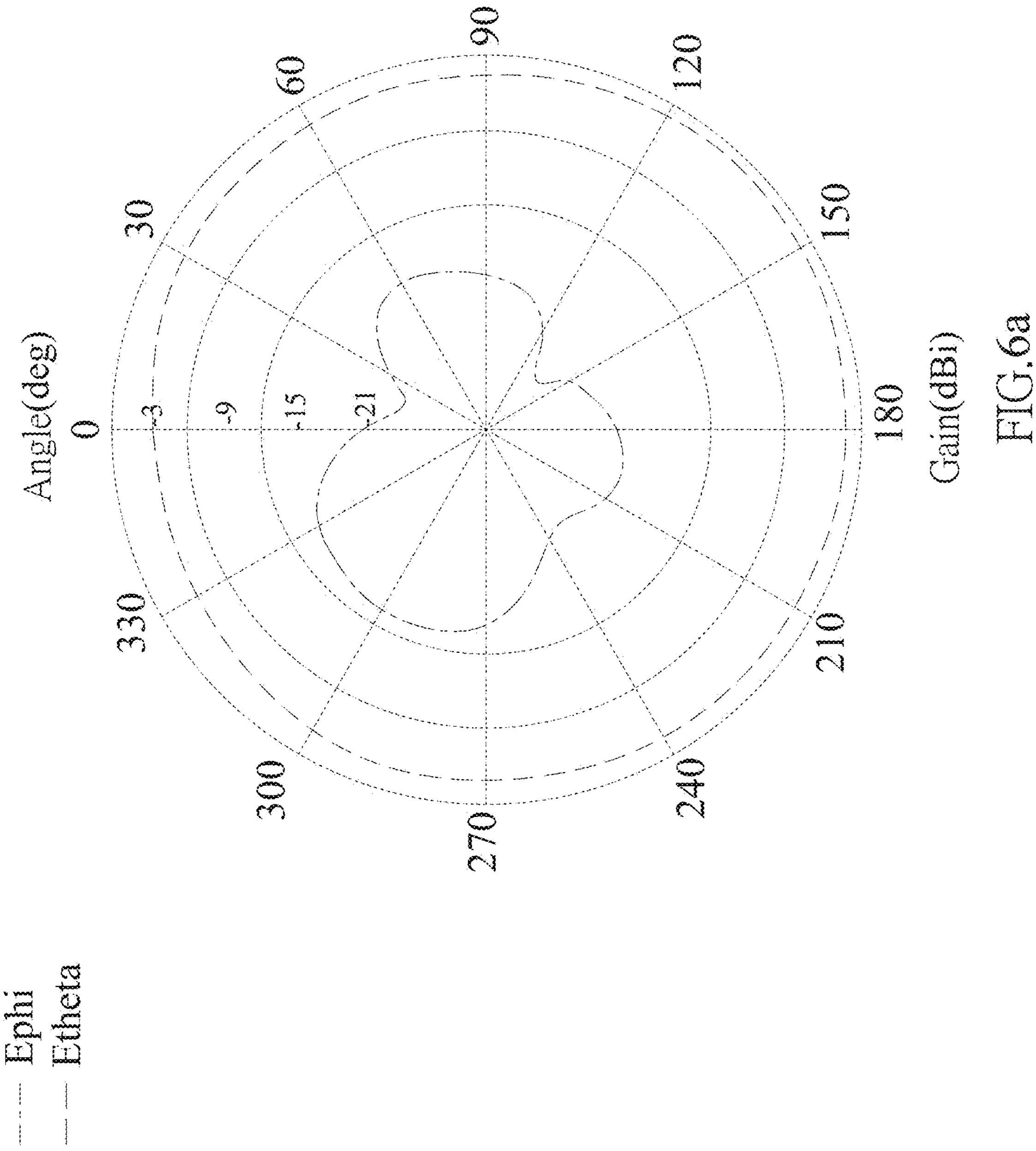
FIG. 6*a* is a schematic view showing a radiation pattern of the X-Y plane of the planar antenna operating at 2400 MHz according to the first embodiment of the present invention.
Figure 6B:
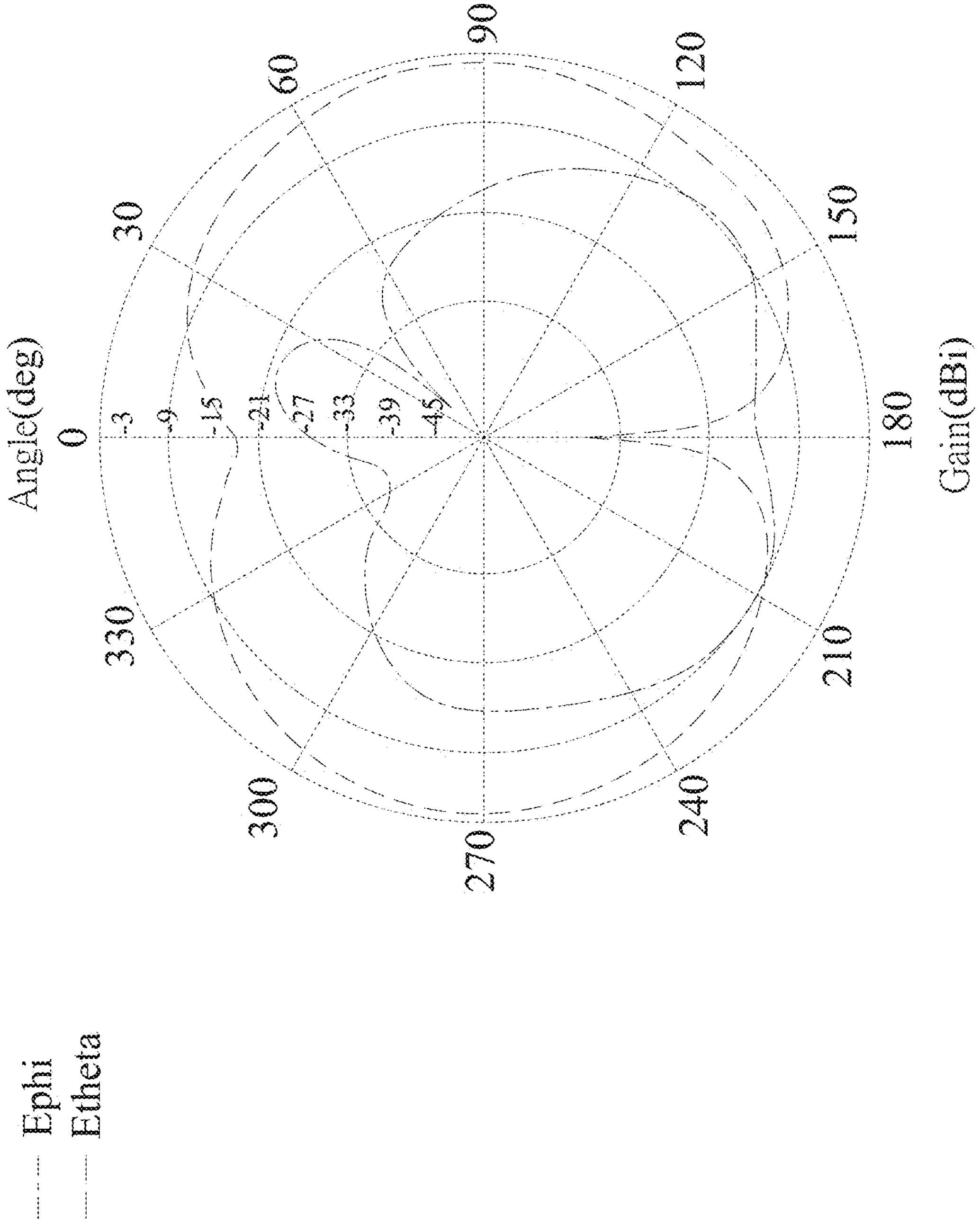
FIG. 6*b* is a schematic view showing a radiation pattern of the Y-Z plane of the planar antenna operating at 2400 MHz according to the first embodiment of the present invention.
Figure 6C:
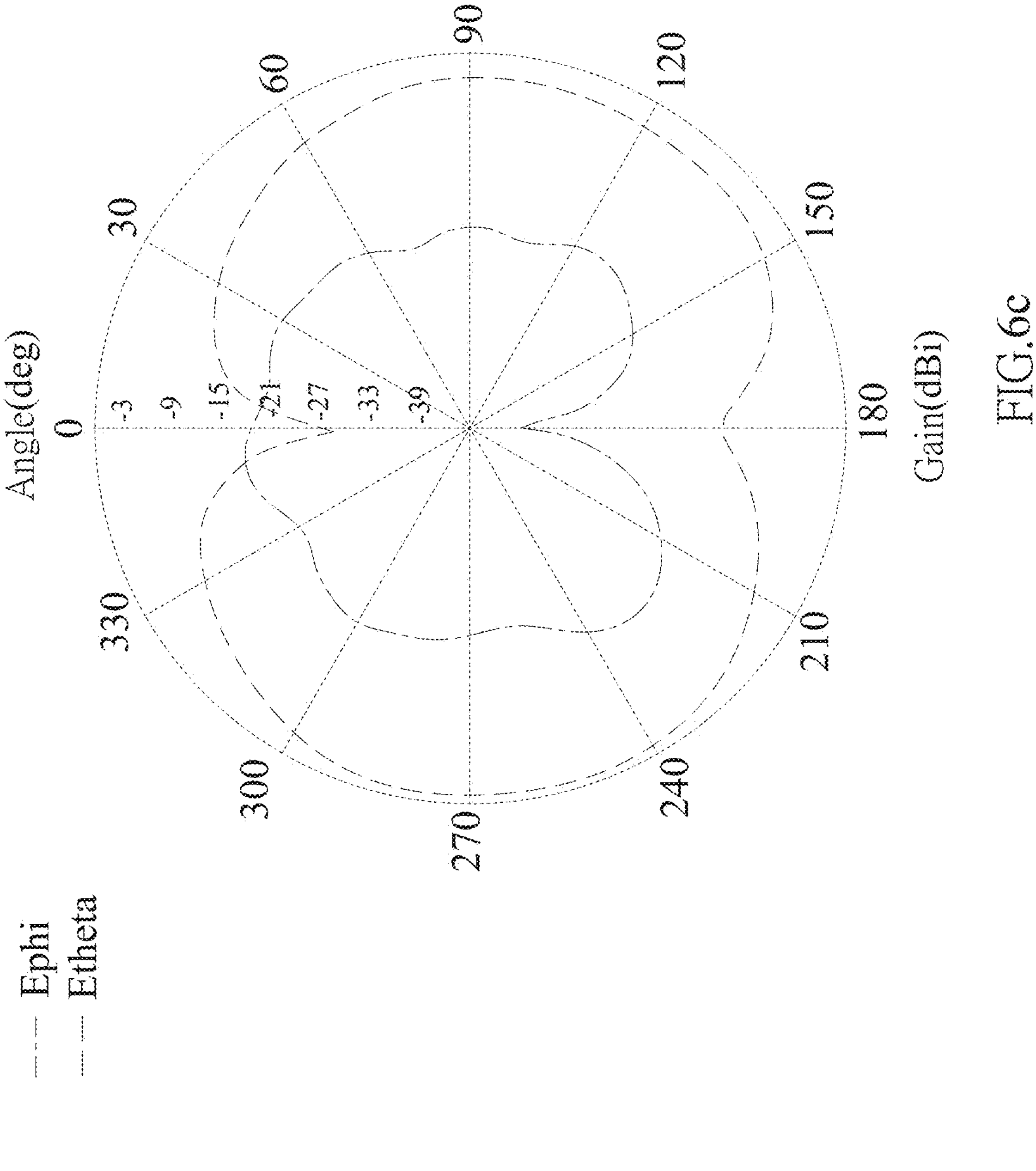
FIG. 6*c* is a schematic view showing a radiation pattern of the X-Z plane of the planar antenna operating at 2400 MHz according to the first embodiment of the present invention.
Figure 7A:
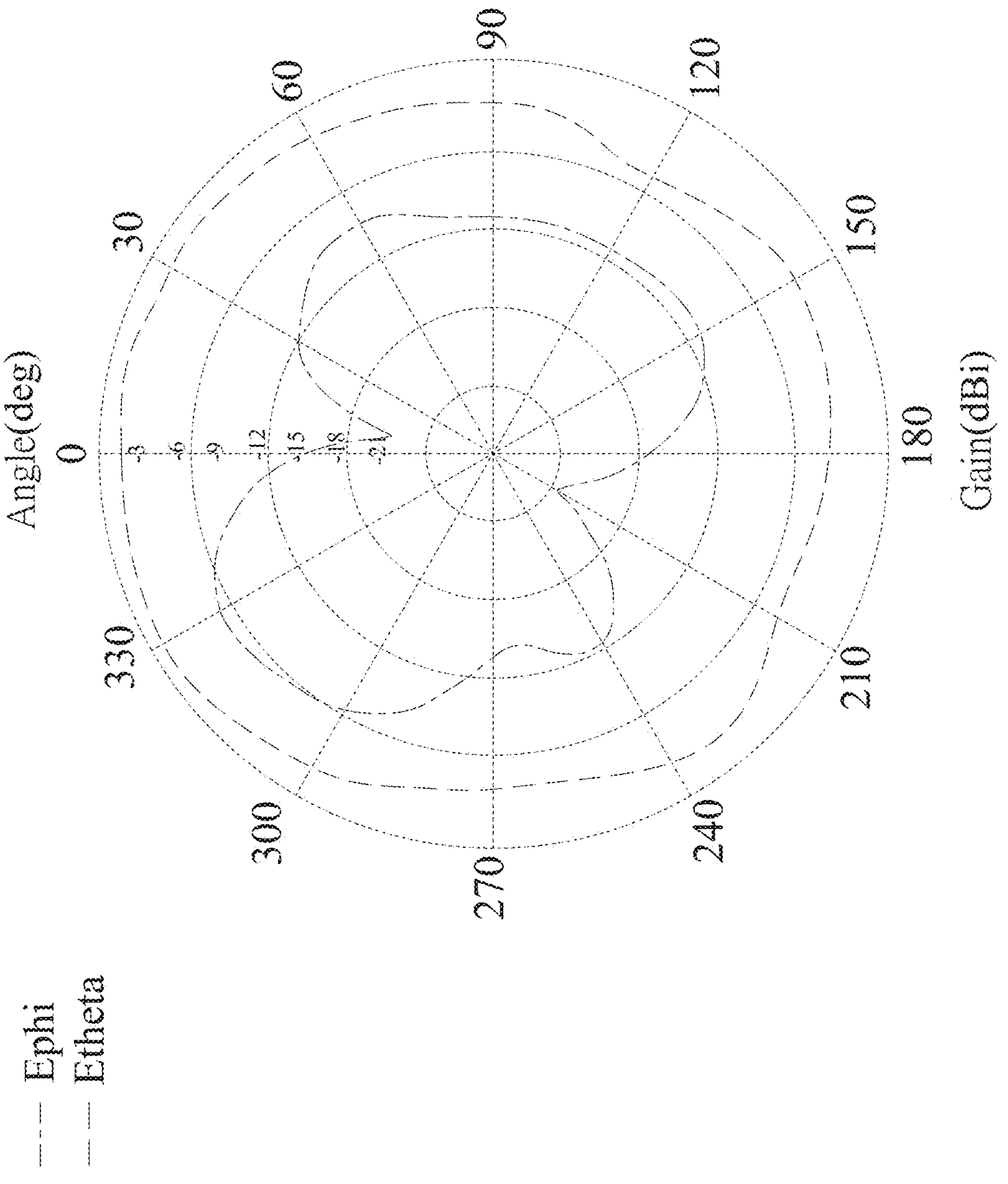
FIG. 7*a* is a schematic view showing a radiation pattern of the X-Y plane of the planar antenna operating at 5150 MHz according to the first embodiment of the present invention.
Figure 7B:
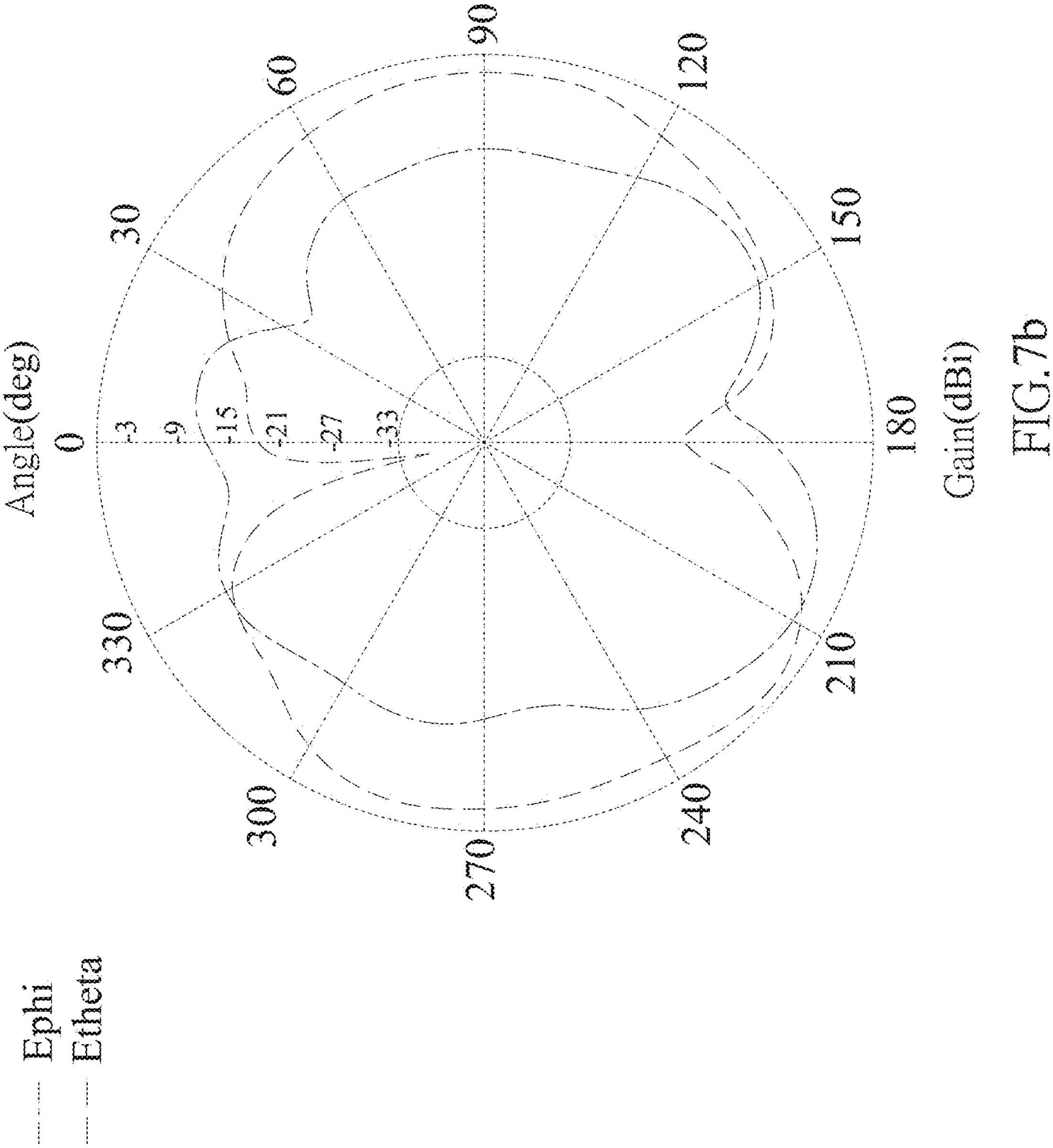
FIG. 7*b* is a schematic view showing a radiation pattern of the Y-Z plane of the planar antenna operating at 5150 MHz according to the first embodiment of the present invention.
Figure 7C:
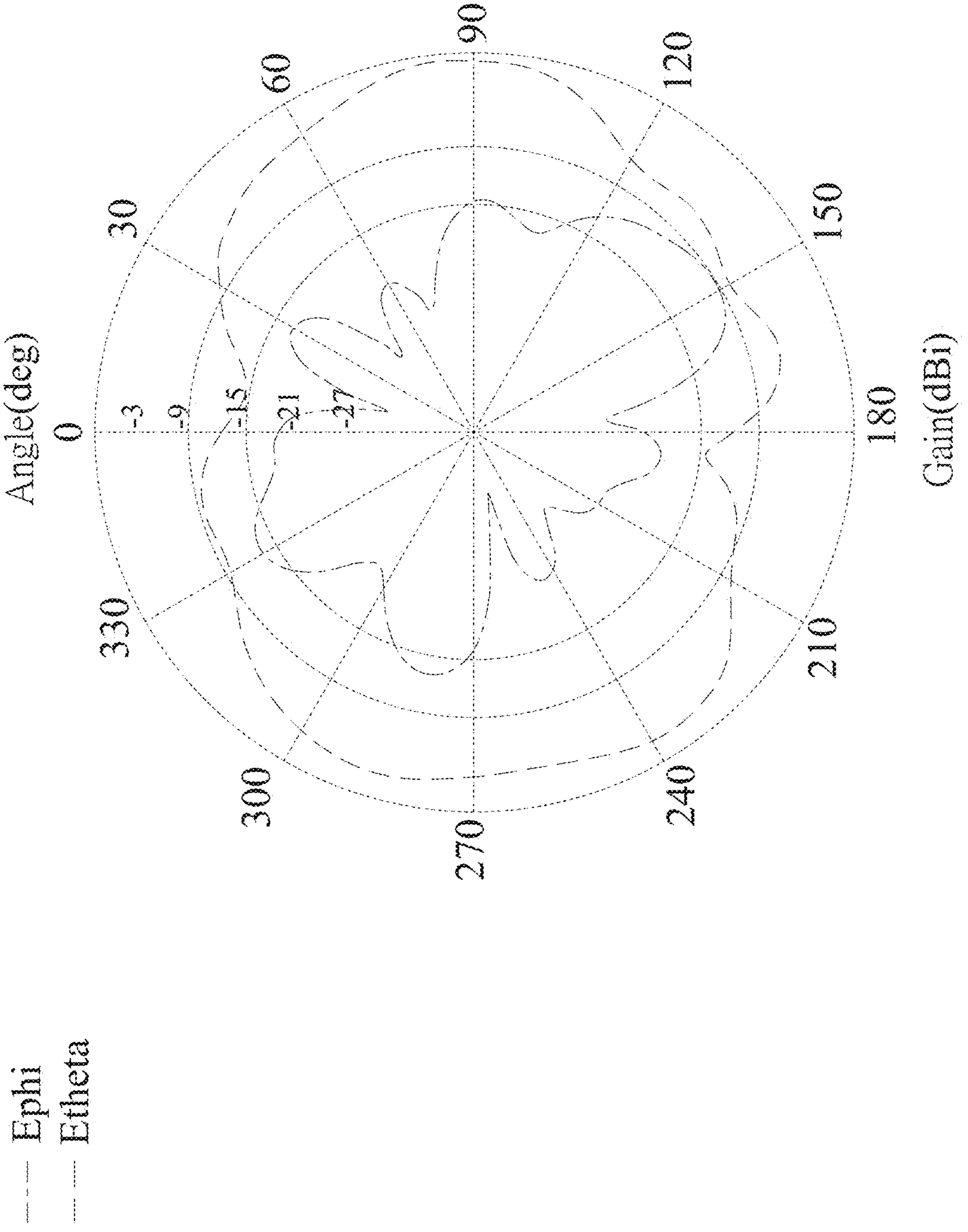
FIG. 7*c* is a schematic view showing a radiation pattern of the X-Z plane of the planar antenna operating at 5150 MHz according to the first embodiment of the present invention.
Figure 8A:
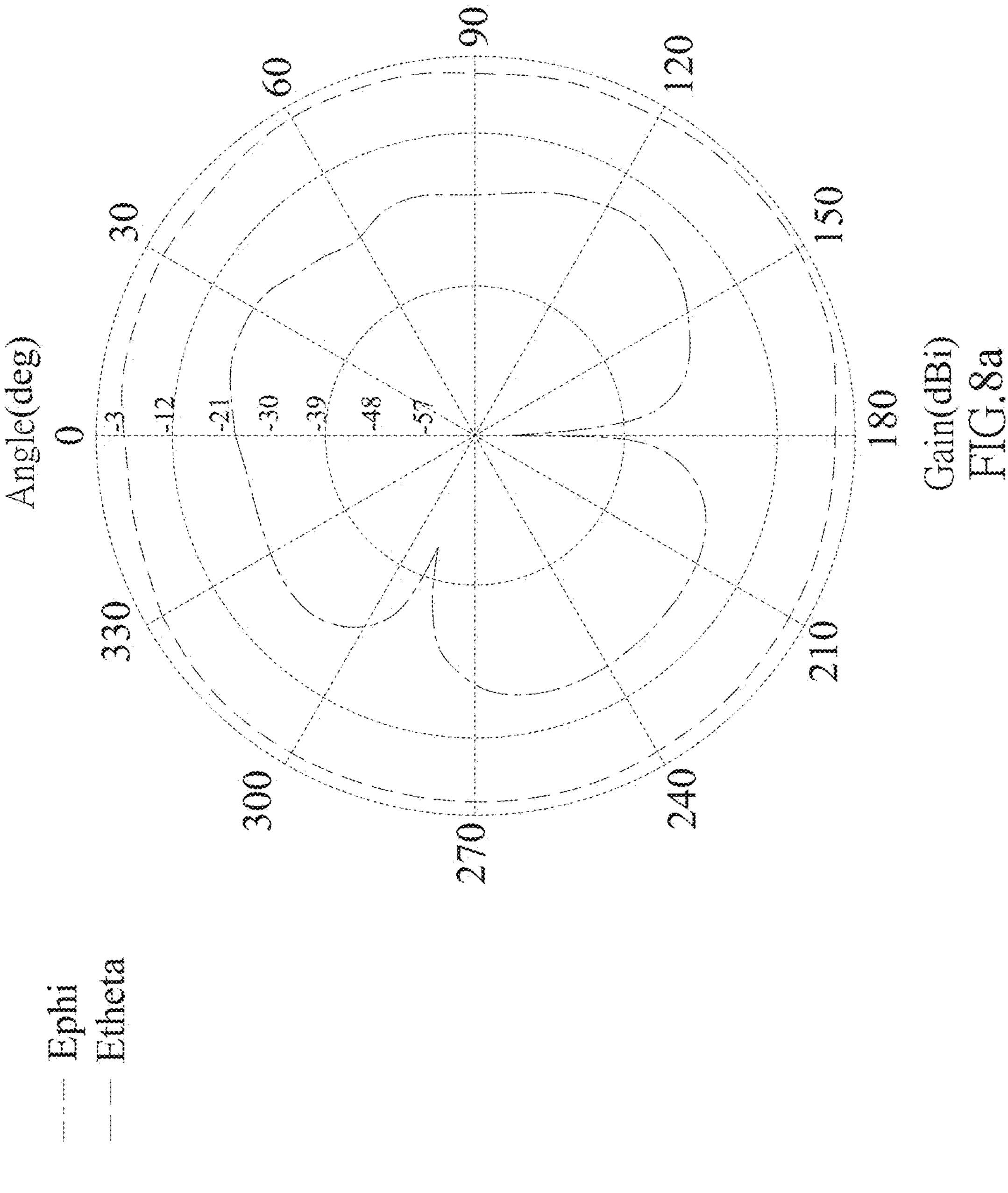
FIG. 8*a* is a schematic view showing a radiation pattern of the X-Y plane of the planar antenna operating at 5925 MHz according to the first embodiment of the present invention.
Figure 8B:
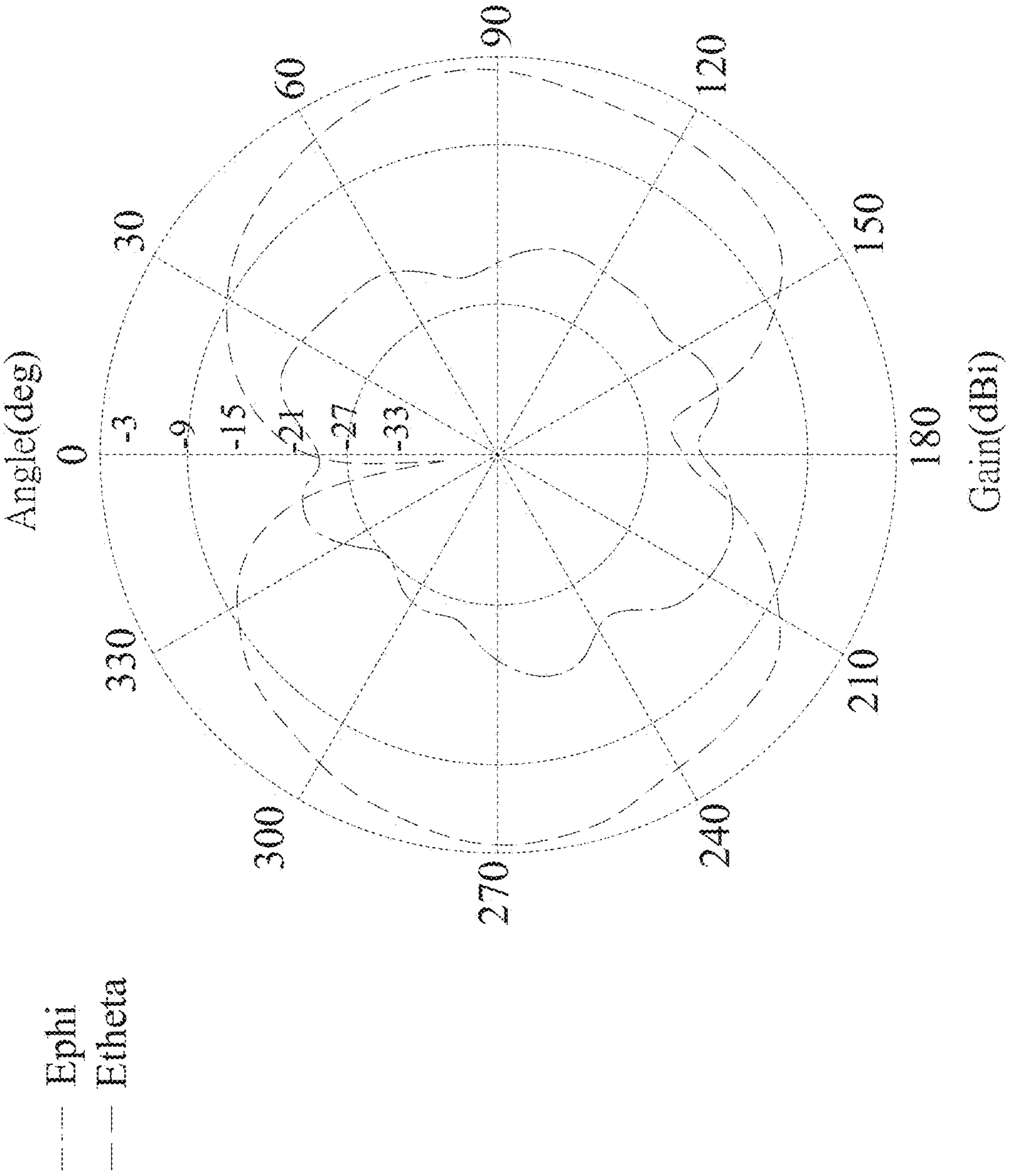
FIG. 8*b* is a schematic view showing a radiation pattern of the Y-Z plane of the planar antenna operating at 5925 MHz according to the first embodiment of the present invention.
Figure 8C:
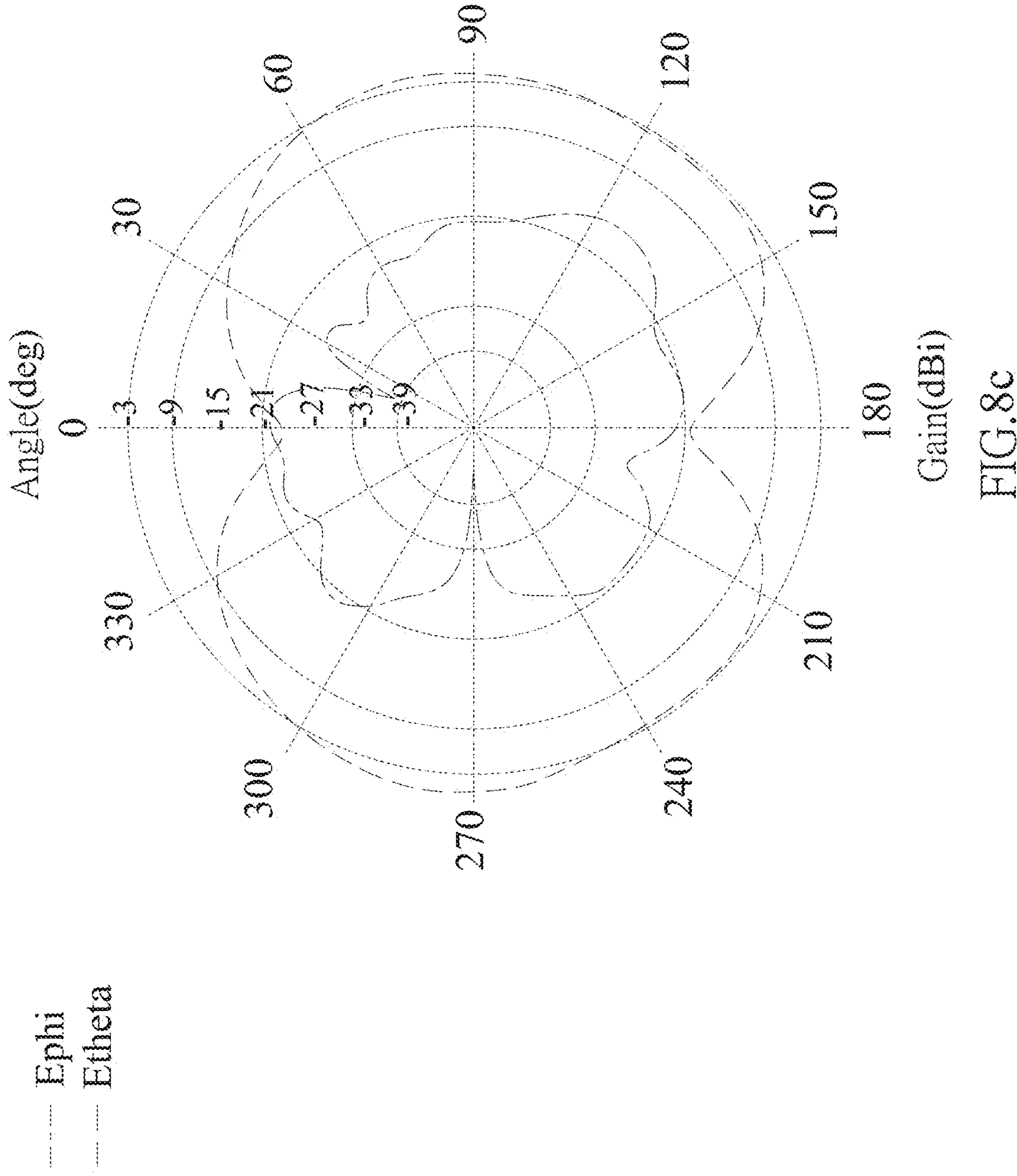
FIG. 8*c* is a schematic view showing a radiation pattern of the X-Z plane of the planar antenna operating at 5925 MHz according to the first embodiment of the present invention.
Figure 9A:
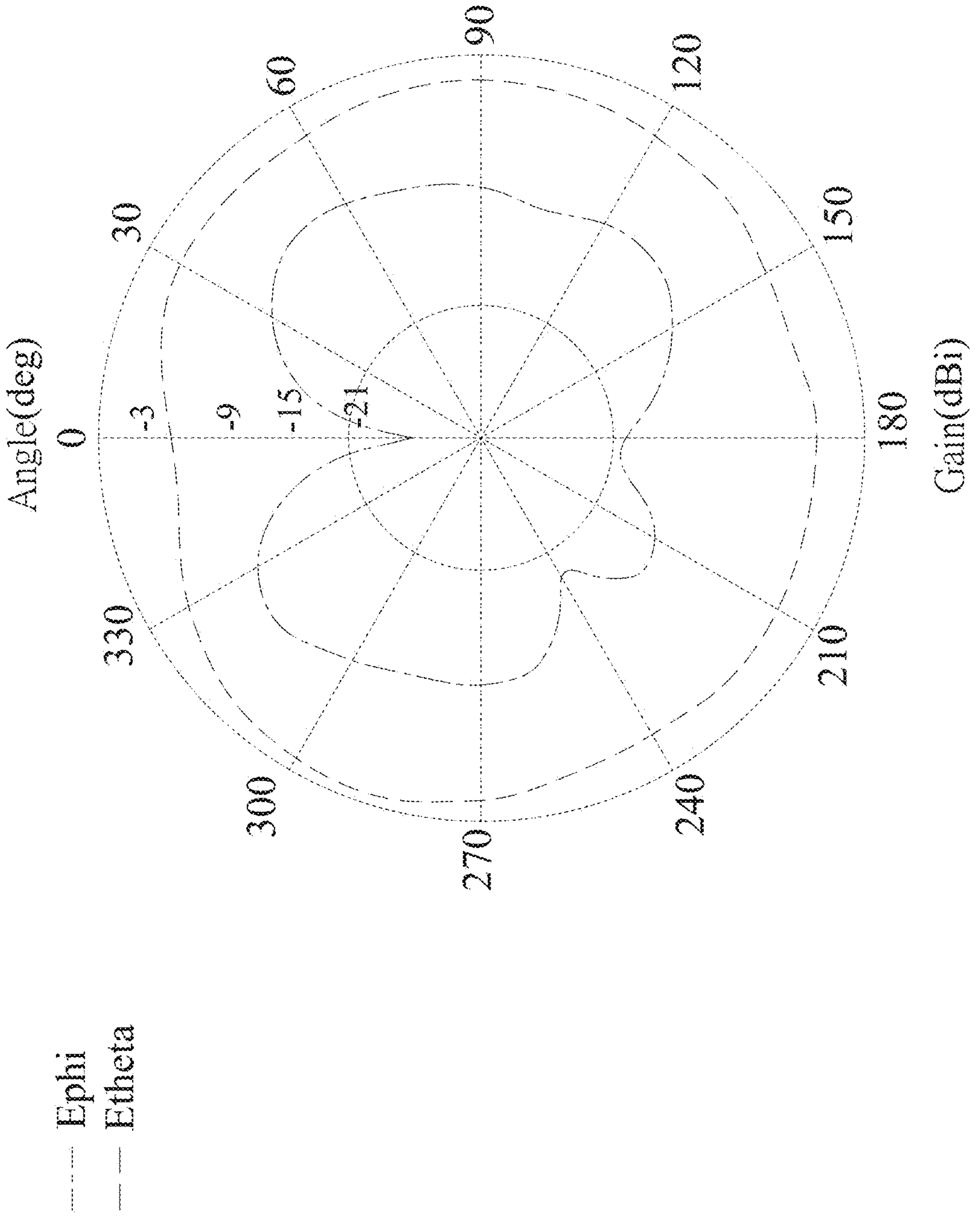
FIG. 9*a* is a schematic view showing a radiation pattern of the X-Y plane of the planar antenna operating at 6875 MHz according to the first embodiment of the present invention.
Figure 9B:
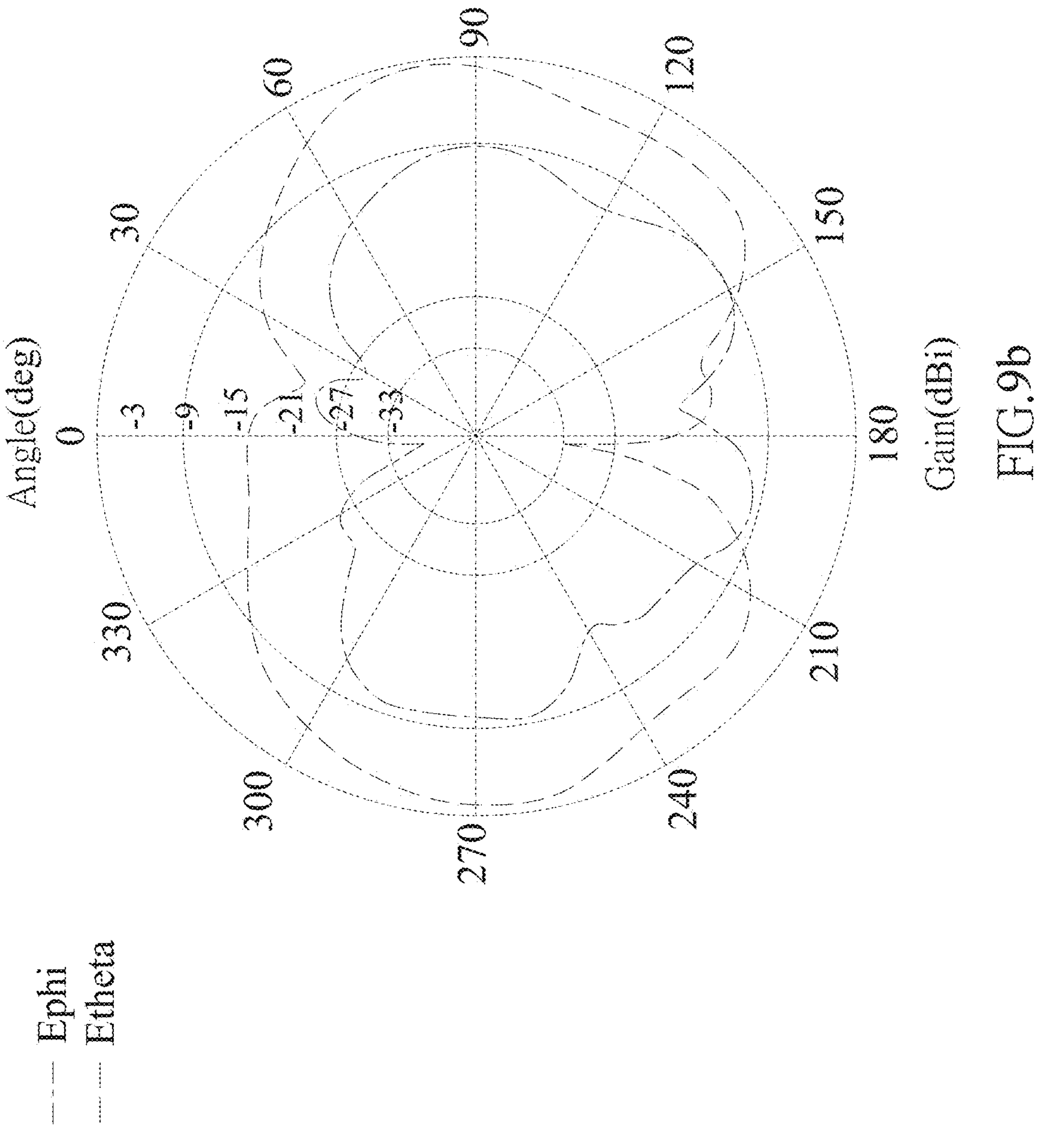
FIG. 9*b* is a schematic view showing a radiation pattern of the Y-Z plane of the planar antenna operating at 6875 MHz according to the first embodiment of the present invention.
Figure 9C:
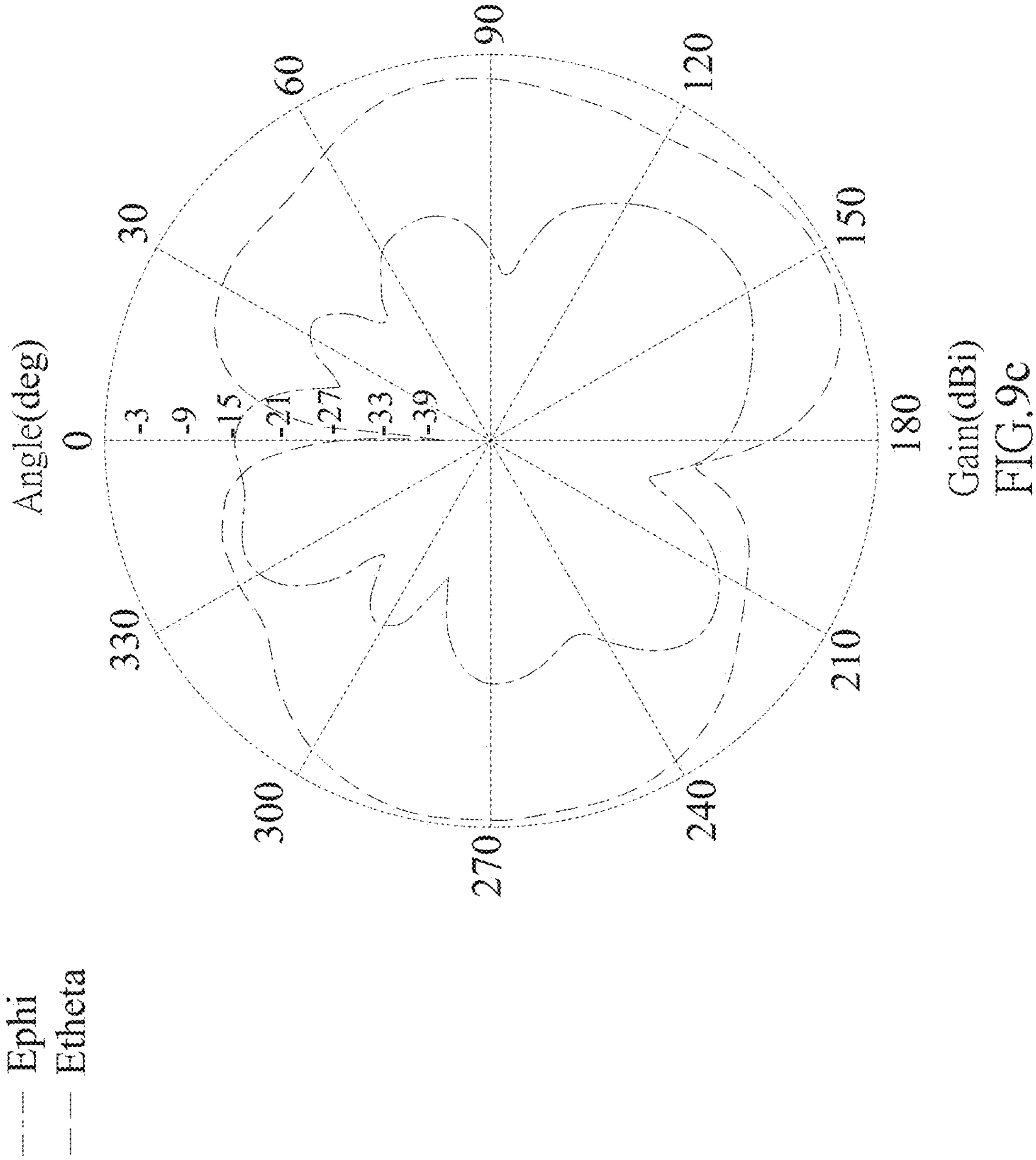
FIG. 9*c* is a schematic view showing a radiation pattern of the X-Z plane of the planar antenna operating at 6875 MHz according to the first embodiment of the present invention.

FIG. 5 shows a return loss of S11 of the planar antenna 100 operating between 2.2 GHz and 7.4 GHz. Table 1 lists an efficiency and a peak gain corresponding to each of the frequencies at which the planar antenna 100 operates. FIG. 6*a* to FIG. 6*c* respectively shows a radiation pattern of a X-Y plane of the planar antenna 100, a radiation pattern of a Y-Z plane of the planar antenna 100, and a radiation pattern of a X-Z plane of the planar antenna 100 when the planar antenna 100 operates at 2400 MHz. FIG. 7*a* to FIG. 7*c* respectively shows a radiation pattern of the X-Y plane of the planar antenna 100, a radiation pattern of the Y-Z plane of the planar antenna 100, and a radiation pattern of the X-Z plane of the planar antenna 100 when the planar antenna 100 operates at 5150 MHz. FIG. 8*a* to FIG. 8*c* respectively shows a radiation pattern of the X-Y plane of the planar antenna 100, a radiation pattern of the Y-Z plane of the planar antenna 100, and a radiation pattern of the X-Z plane of the planar antenna 100 when the planar antenna 100 operates at 5925 MHz. FIG. 9*a* to FIG. 9*c* respectively shows a radiation pattern of the X-Y plane of the planar antenna 100, a radiation pattern of the Y-Z plane of the planar antenna 100, and a radiation pattern of the X-Z plane of the planar antenna 100 when the planar antenna 100 operates at 6875 MHz. Referring to FIG. 5 to FIG. 9*c* and Table 1, it is known that an operating frequency band of the planar antenna 100 could be applied to a frequency band of 2.5 GHz, a frequency band of 5 GHz, and a frequency band of 6 GHz from Wi-Fi 4 to Wi-Fi 7.

TABLE 1

The efficiencies of the planar antenna 100 and the peak gains of the planar antenna 100

| Frequency (MHz) | Efficiency (%) | Peak gain (dBi) |
|---|---|---|
| 2400 | 72.05 | 1.39 |
| 2450 | 71.16 | 1.57 |
| 2500 | 69.27 | 1.96 |
| 5150 | 68.23 | 2.17 |
| 5250 | 66.06 | 2.26 |
| 5350 | 65.33 | 2.35 |
| 5470 | 65.95 | 2.27 |
| 5600 | 66.85 | 2.22 |
| 5725 | 67.23 | 2.25 |
| 5785 | 67.50 | 2.44 |
| 5850 | 65.77 | 2.44 |
| 5925 | 62.79 | 2.51 |
| 6245 | 56.41 | 2.55 |
| 6525 | 54.98 | 2.92 |

TABLE 1-continued

The efficiencies of the planar antenna 100 and the peak gains of the planar antenna 100

| Frequency (MHz) | Efficiency (%) | Peak gain (dBi) |
|---|---|---|
| 6875 | 52.50 | 2.80 |
| 7125 | 51.01 | 2.00 |

Figure 10:
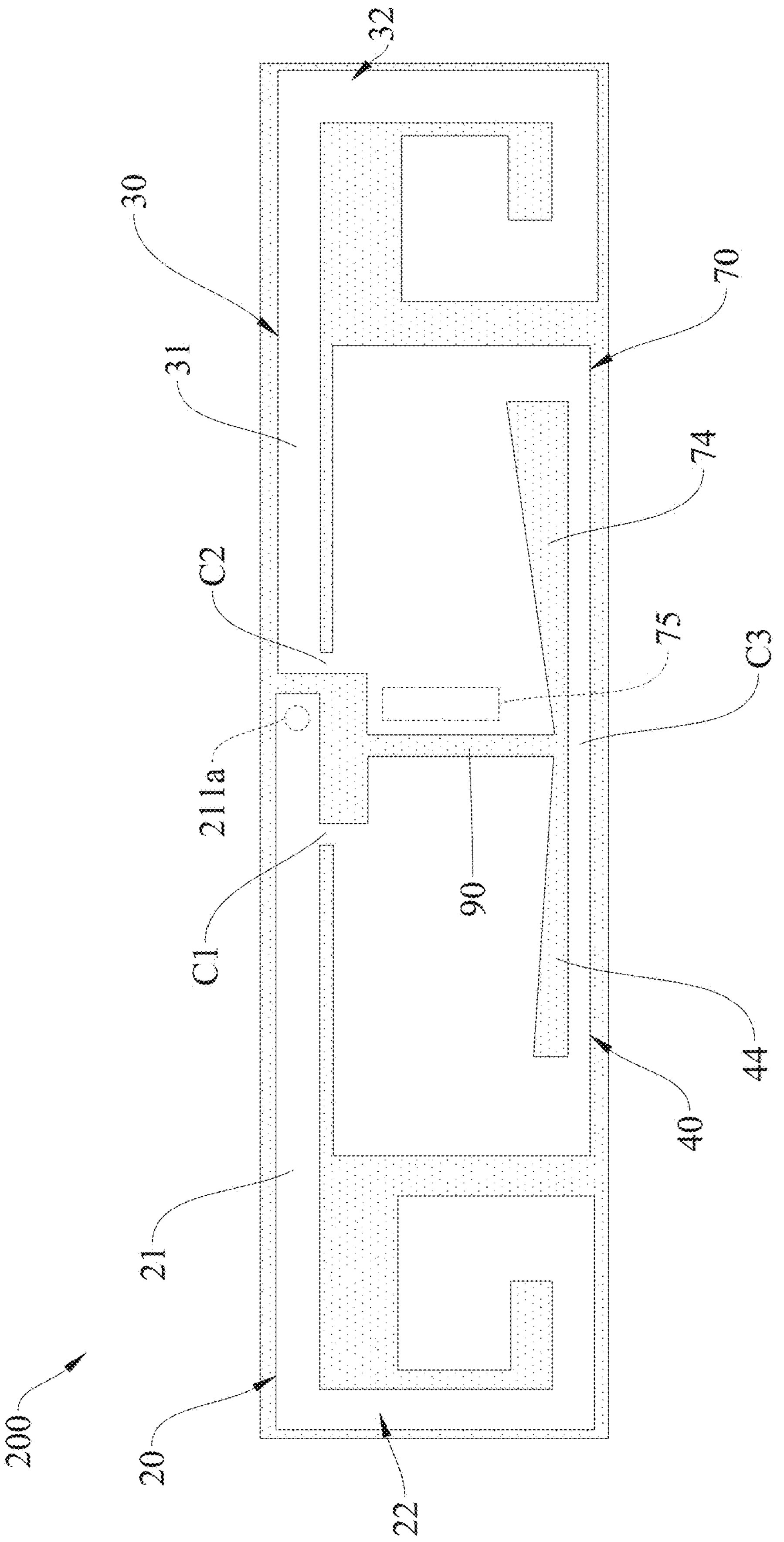
FIG. 10 is a schematic view of the planar antenna according to a second embodiment of the present invention.
Figure 11:
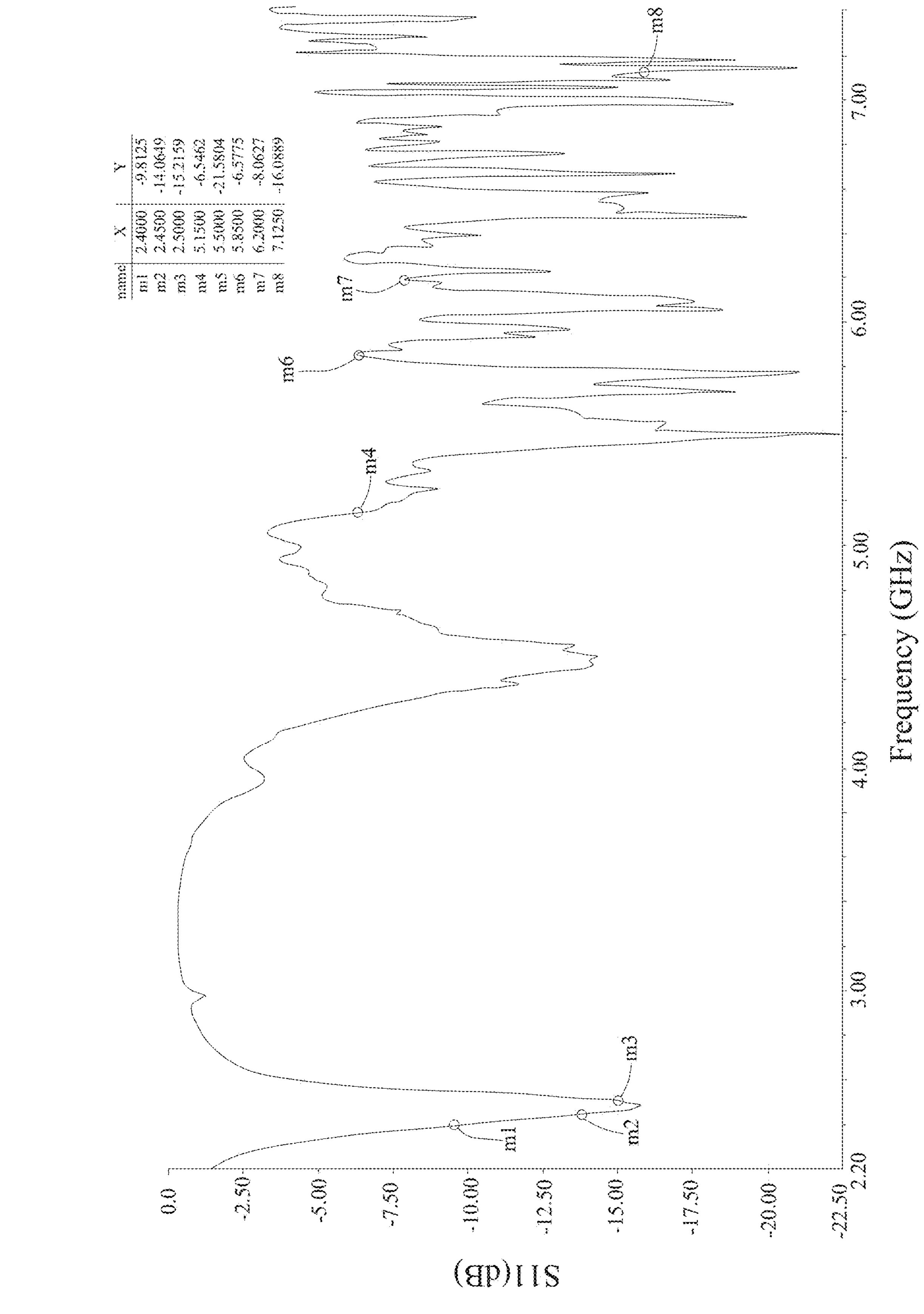
FIG. 11 is a schematic view showing a return loss of the planar antenna operating between 2.2 GHz and 7.4 GHz according to the second embodiment of the present invention.

A planar antenna 200 according to a second embodiment of the present invention is illustrated in FIG. 10 and FIG. 11. A structure of the planar antenna 200 is almost the same as the structure of the planar antenna 100 of the first embodiment, except that the planar antenna 200 does not include the matching section 60. FIG. 11 shows a return loss of S11 of the planar antenna 200 operating between 2.2 GHz and 7.4 GHz. In the current embodiment, it is known that an operating frequency band of the planar antenna 200 could be likewise applied to many frequency bands as shown in FIG. 11 and the structure of the planar antenna 200 could achieve size reduction.

Referring to FIG. 11 of the second embodiment, when the planar antenna 200 operates at the frequency of 2.4 GHz, a frequency offset arises compared with the first embodiment but the frequency offset is within a tolerable range; although a resonant frequency of the planar antenna 200 is provided between the frequency of 4 GHz and the frequency of 5 GHz, the frequency of 4 GHz to 5 GHz is not used for Wi-Fi and hence the resonant frequency is tolerable for Wi-Fi. In the first embodiment, the matching section 60 is provided, so that the frequency offset at the frequency of 2.4 GHz could be adjusted, an intensity of the frequency offset could be reduced, and a resonance at the frequency between 4 GHz and 5 GHz could be effectively weakened and offset.

It must be pointed out that the embodiments described above are only some preferred embodiments of the present invention. All equivalent structures which employ the concepts disclosed in this specification and the appended claims should fall within the scope of the present invention.

What is claimed is:

1. A planar antenna, defined with a first axis and a second axis, wherein the second axis is perpendicular to the first axis; the first axis is defined with a first direction and a second direction opposite to the first direction; the second axis is defined with a third direction and a fourth direction opposite to the third direction; the planar antenna comprises:

a substrate having a surface;

a first radiation element disposed on the surface of the substrate and having a first main section and a first radiation section, wherein the first main section has a first end and a second end along the first axis; the first end of the first main section is adapted to be fed with a signal; the first main section extends from the first end of the first main section to the second end of the first main section in the first direction; the first radiation section is connected to the second end of the first main section and is located on a side of the first main section in the third direction;

a first ground element disposed on the surface of the substrate and having a second main section and a first ground section, wherein the second main section has a first end and a second end along the first axis; the second main section extends from the first end of the second main section to the second end of the second main section in the second direction; the first ground section is connected to the second end of the second main section and is located on a side of the second main section in the third direction;

a second radiation element disposed on the surface of the substrate, wherein the second radiation element is located on a side of the first main section in the third direction and located on a side of the first radiation section in the second direction; the second radiation element has a first slot, wherein the first slot extends in the first direction and has a first open end and a first closed end; the first slot has a first inclined edge and a first straight edge; along the second axis, the first inclined edge is located between the first main section of the first radiation element and the first straight edge;

a second ground element disposed on the surface of the substrate, wherein the second ground element is located on a side of the second main section in the third direction and located on a side of the first ground section in the first direction; the second ground element has a second slot, wherein the second slot extends in the second direction and has a second open end and a second closed end; the second open end corresponds to the first open end; a width of the second slot of the second ground element gradually increases in the second direction;

wherein a separating slot is formed between the second radiation element and the second ground element and extends along the second axis; an end of the separating slot communicates with the first open end and the second open end;

wherein the second radiation element is connected to the first main section of the first radiation element through a first connecting section; the second ground element is connected to the second main section of the first ground element through a second connecting section.

2. The planar antenna as claimed in claim 1, wherein the separating slot comprises a first slot section and a second slot section; the first slot section is located between the first connecting section and the second connecting section along the first axis; the second slot section extends along the second axis; an end of the second slot section communicates with the first open end and the second open end; the other end of the second slot section communicates with the first slot section.

3. The planar antenna as claimed in claim 1, wherein a width of the first slot of the second radiation element gradually increases in the first direction.

4. The planar antenna as claimed in claim 1, wherein a first angle is formed between an imaginary extension of the first inclined edge and an imaginary extension of the first straight edge; the second slot has a second inclined edge and a second straight edge; a second angle is formed between an imaginary extension of the second inclined edge and an imaginary extension of the second straight edge; the second angle is greater than the first angle.

5. The planar antenna as claimed in claim 1, further comprising a matching section, wherein the matching section is disposed on the surface of the substrate and is located on a side of the first connecting section in the first direction; the matching section is connected to the first main section of the first radiation element and the second radiation element.

6. The planar antenna as claimed in claim 1, wherein the second radiation element has a first edge and a second edge along the second axis; the first edge of the second radiation element is located between the first main section of the first radiation element and the second edge of the second radiation element; along the second axis, a distance between the first edge of the second radiation element and the second edge of the second radiation element is a first distance and a minimum distance between the first edge of the second radiation element and the first closed end of the first slot is a second distance; the second distance is between 0.7 and 0.9 times the first distance.

7. The planar antenna as claimed in claim 1, wherein the second ground element has a first edge and a second edge along the second axis; the first edge of the second ground element is located between the second main section of the first ground element and the second edge of the second ground element; along the second axis, a distance between the first edge of the second ground element and the second edge of the second ground element is a first distance and a minimum distance between the first edge of the second ground element and the second closed end of the second slot is a second distance; the second distance is between 0.6 and 0.7 times the first distance.

8. The planar antenna as claimed in claim 1, wherein the first radiation section comprises a first side section, a second side section, a third side section, and a first extending section; the first side section is connected to the second end of the first main section and extends in the third direction; the second side section is connected to an end of the first side section and extends in the second direction; the third side section is connected to an end of the second side section and extends in the fourth direction; the first extending section is connected to an end of the third side section and extends in the first direction.

9. The planar antenna as claimed in claim 1, wherein the first ground section comprises a fourth side section, a fifth side section, a sixth side section, and a second extending section; the fourth side section is connected to the second end of the second main section and extends in the third direction; the fifth side section is connected to an end of the fourth side section and extends in the first direction; the sixth side section is connected to an end of the fifth side section and extends in the fourth direction; the second extending section is connected to an end of the sixth side section and extends in the second direction.

* * * * *